United States Patent [19]
Rubin et al.

[11] Patent Number: 5,778,432
[45] Date of Patent: Jul. 7, 1998

[54] METHOD AND APPARATUS FOR PERFORMING DIFFERENT CACHE REPLACEMENT ALGORITHMS FOR FLUSH AND NON-FLUSH OPERATIONS IN RESPONSE TO A CACHE FLUSH CONTROL BIT REGISTER

[75] Inventors: Lawrence H. Rubin; Paul A. Reed, both of Austin, Tex.

[73] Assignee: Motorola, Inc., Schaumburg, Ill.

[21] Appl. No.: 674,050

[22] Filed: Jul. 1, 1996

[51] Int. Cl.$^6$ .............................. G06F 12/12; G06F 13/00
[52] U.S. Cl. .................. 711/135; 711/136; 711/134; 711/133
[58] Field of Search ........................ 395/460, 461, 395/462, 463, 471, 486, 487; 711/133, 134, 135, 136, 144, 159, 160

[56] References Cited

U.S. PATENT DOCUMENTS

| | | | |
|---|---|---|---|
| 5,363,496 | 11/1994 | Kato et al. | 711/135 |
| 5,524,234 | 6/1996 | Martinez, Jr. et al. | 711/141 |
| 5,581,727 | 12/1996 | Collins et al. | 711/135 |
| 5,586,293 | 12/1996 | Baron et al. | 711/135 |

OTHER PUBLICATIONS

Motorola Inc. / IBM, "PowerPC 604 RISC Micrprocessor User's Manual", Chapter 3, pp. 3-1 through 3-44, © 1994(portions © 1991-1994).

Motorola Inc. / IBM, "PowerPC 603 RISC Microprocessor User's Manual", Chapter 5, pp. 5-1 through 5-29, © 1994 (Portions © 1991-1994).

Y. Devill, et al."A class of replacement policies for medium and high-associativity structures", pp. 55-64; SIGARCH Conf; Labs.d'Electronique Philips,22 Av.Descaries, B.P.15.94453 Limcil-Brevannes,Fr.

D. Jain, et al., "Design Issues In The PowerPC 620TM Caches", 1995 High Performance Systems Design Conference, pp. 1-26, © 1994.

*Primary Examiner*—Glenn Gossage
*Attorney, Agent, or Firm*—Sandra L. Godsey; Susan C. Hill

[57] ABSTRACT

A method and apparatus for efficiently performing a cache operation in a processor (70) for both flushing and non-flushing. One embodiment uses a cache flush control bit (100) in a data cache (90) to determine whether or not to ignore valid bits (130) during a pseudo least recently used (LRU) replacement algorithm. When the replacement algorithm is being used for flushing the data cache (90), the valid bits (130) are not used in order to make the algorithm more efficient. If the valid bits (130) are ignored, then the least recently used bits (120) are used to select the cache line that will be replaced. However, when the replacement algorithm is being used for a non-flushing replacement purpose, the valid bits (130) are used first, followed by the plurality of least recently used bits (120), to select the cache line that will be replaced.

12 Claims, 4 Drawing Sheets

FIG.1 -PRIOR ART-

METHOD AND APPARATUS FOR PERFORMING DIFFERENT CACHE REPLACEMENT ALGORITHMS FOR FLUSH AND NON-FLUSH OPERATIONS IN RESPONSE TO A CACHE FLUSH CONTROL BIT REGISTER

FIELD OF THE INVENTION

The present invention relates in general to a data processing system, and more particularly to a method and apparatus for operating a flushable cache.

BACKGROUND OF THE INVENTION

Many data processing systems today require the use of at least one cache. One application uses a cache to store data in order to reduce the number of accesses required to a main memory. The processor then uses and manipulates the data in the cache rather than main memory. In data processing systems in which multiple resources may access and manipulate the data in main memory, it is important to keep coherency between the various resources. Thus it may be required for a processor to flush its cache which is a process whereby the processor writes the valid and current information from its cache back into main memory.

In some data processing systems, data must be valid and have been modified in order for the processor to write that data back into main memory. When new data from main memory is brought into a cache, the cache must determine which portion of the cache in which to store the new data.

Most caches use a replacement algorithm to determine which portion of the cache the data shall be stored in. One type of replacement algorithm is the least recently used (LRU) algorithm. One variation of the least recently used algorithm is a pseudo random replacement algorithm which is called a pseudo least recently used algorithm. An advantage of the pseudo least recently used algorithm is its simplified circuitry requirements. However, a problem arises when the replacement algorithm has not been optimized for flushing the cache.

The prior art replacement algorithm illustrated in FIG. 1 is very efficient for non-flushing replacement operations. However, this algorithm is less efficient for flushing replacement operations. In general, the steps illustrated in FIG. 1 are repeated for each line within the set of the cache. For example, if there are 8 lines in the set, the steps illustrated in FIG. 1 will be repeated 8 times. However, if the replacement algorithm illustrated in FIG. 1 is used to flush the same cache having 8 lines depending on the state of the LRU bits and the valid bits, it may require 12 iterations through the steps in FIG. 1 in order to completely flush all 8 lines of the cache within the set. Thus a replacement algorithm is needed that would be as efficient for flushing as it was for non-flushing replacement. Note that it is common in caches for the same hardware that is used for non-flushing replacement to also be used for flushing the cache.

Additional considerations when using a random replacement algorithm or a pseudo random replacement algorithm include effective compatibility with other cache functions. As an example, snooping refers to an external access of a cache which may invalidate blocks or lines. Typical cache protocol restricts snooping during replacement and flush operations. Compatibility considerations are also important to the user. An optimum method for replacement and flushing of a cache will increase both system flexibility and overall system compatibility.

DESCRIPTION OF THE PREFERRED EMBODIMENTS

A replacement algorithm having improved efficiency during a cache flush is required. Although the present invention is described using a pseudo least recently used replacement algorithm, alternate embodiments of the present invention may use any other type of replacement algorithm or algorithm based on an access profile of a cache. The present invention allows the replacement algorithm to be modified, or allows one or more different paths in the replacement algorithm flow to be taken, based upon whether or not the replacement operation is a cache flush operation. Thus, the replacement algorithm may be optimized for both flushing and non-flushing operations.

In one embodiment of the present invention, a cache flush control bit 100 (see FIG. 4) is used to modify the replacement algorithm when a cache flush operation is being performed. The cache flush control bit 100 may be asserted by the software before a cache flush operation is initiated, and negated after the cache flush operation is completed. If the cache flush control bit 100 is asserted, the replacement algorithm may be optimized for cache flushing operation in which all cache lines within a single set are replaced. The replacement algorithm is optimized for cache flushing when each iteration through the replacement algorithm causes a different cache line to be replaced.

DESCRIPTION OF THE FIGURES

Figure 1:
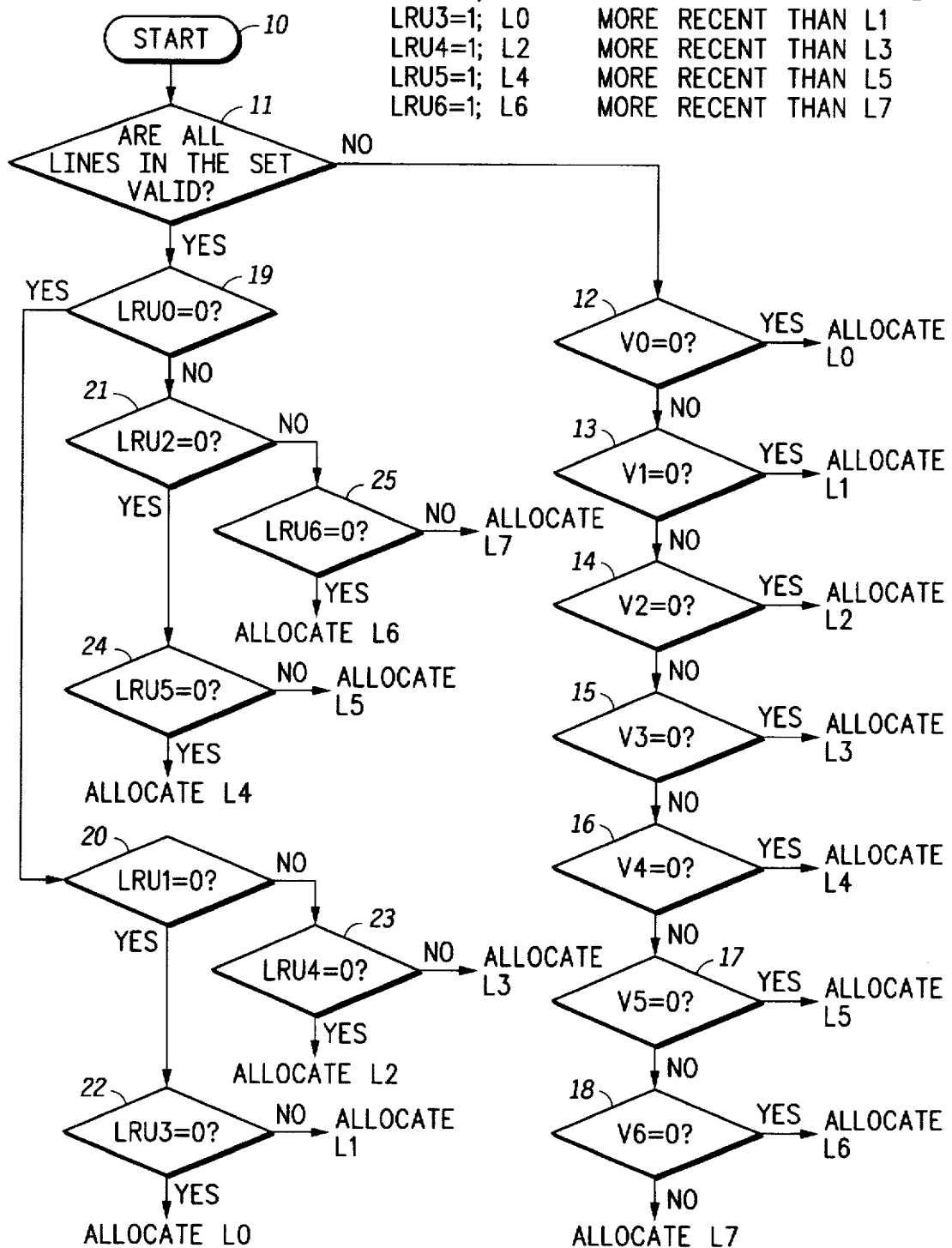
FIG. 1 illustrates, in flow diagram form, a pseudo random replacement algorithm in accordance with the prior art.

FIG. 1 illustrates a prior art pseudo random replacement and flushing algorithm for a cache. Oval 10 represents a starting point. Diamonds 11 through 25 illustrate decision points.

Figure 2:
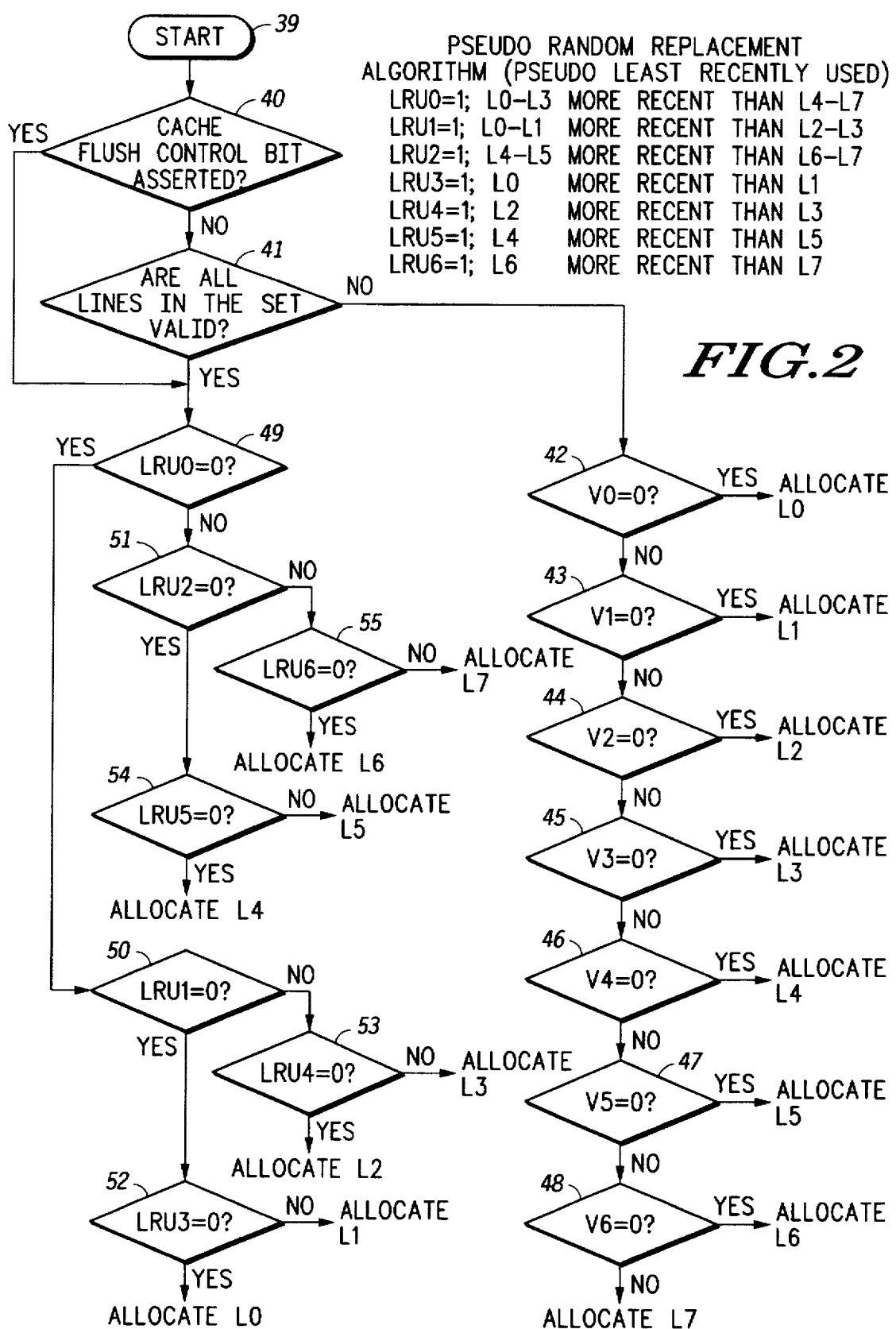
FIG. 2 illustrates, in flow diagram form, a pseudo random replacement algorithm in accordance with one embodiment of the present invention.

FIG. 2 illustrates a pseudo random replacement and flushing algorithm for a cache in accordance with one embodiment of the present invention. Oval 39 indicates a starting point in the flow. Diamonds 40 through 55 indicate decision points in the flow. Alternate embodiments of the present invention may incorporate other algorithms for determining a line for replacement and flushing. One embodiment utilizes a full least recently used algorithm. Note that a full least recently used algorithm is commonly used in the art.

Figure 3:
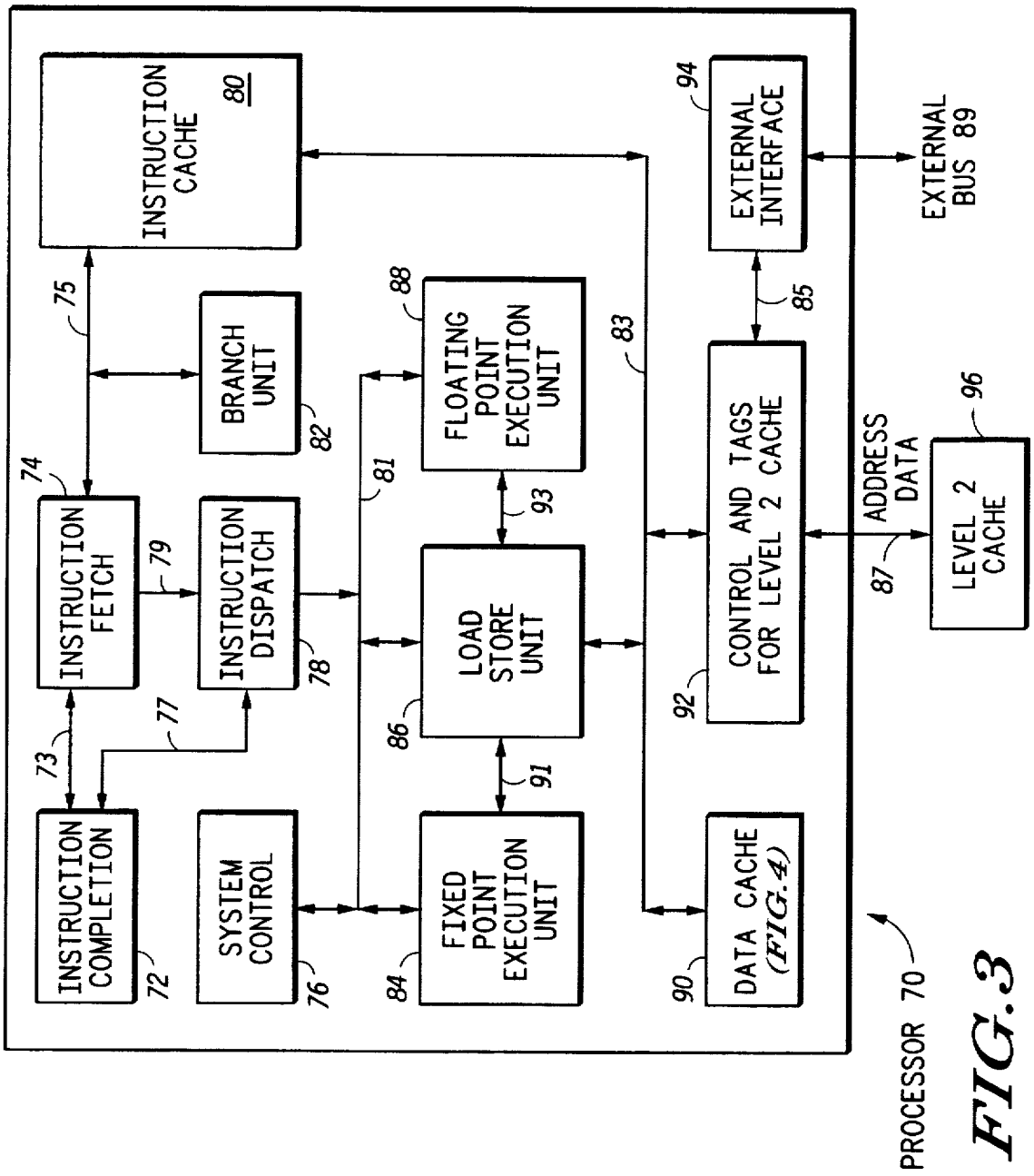
FIG. 3 illustrates, in block diagram form, a processor in accordance with one embodiment of the present invention.

FIG. 3 illustrates one embodiment of a processor 70 in accordance with the present invention. Instruction completion circuitry 72 is coupled to instruction fetch circuitry 74 by way of conductor 73. Instruction completion circuitry 72 is coupled to instruction dispatch circuitry 78 by way of conductor 77.

Instruction fetch circuitry 74 is coupled to instruction cache 80 and branch unit circuitry 82 by way of conductor 75. Instruction fetch circuitry 74 is coupled to instruction dispatch circuitry 78 by way of conductor 79. System control circuitry 76, instruction dispatch circuitry 78, fixed point execution unit 84, load store unit 86, and floating point execution unit 88 are all coupled to bus 81. Load store unit 86, data cache 90, control and tags for level 2 cache circuitry 92, and instruction cache 80 are all coupled to bus 83.

Fixed point execution unit 84 is coupled to load store unit 86 by way of conductors 91. Load store unit 86 is coupled to floating point execution unit 88 by way of conductors 93. Control and tags for level 2 cache circuitry 92 is coupled to external interface 94 by way of conductors 85. Control and tags for level 2 cache circuitry 92 is coupled to level 2 cache 96 by way of conductors 87 for address and data transfers. External interface 94 is coupled external to processor 70 by way of external bus 89.

In one embodiment of the present invention, level 2 cache 96 is implemented external to processor 70. In alternate embodiments of the present invention, level 2 cache 96 may be implemented on the same integrated circuit as processor 70. Note that FIG. 3 illustrates only one possible embodiment of processor 70. Processor 70 may be implemented in a wide variety of ways as long as processor 70 includes a cache.

Figure 4:
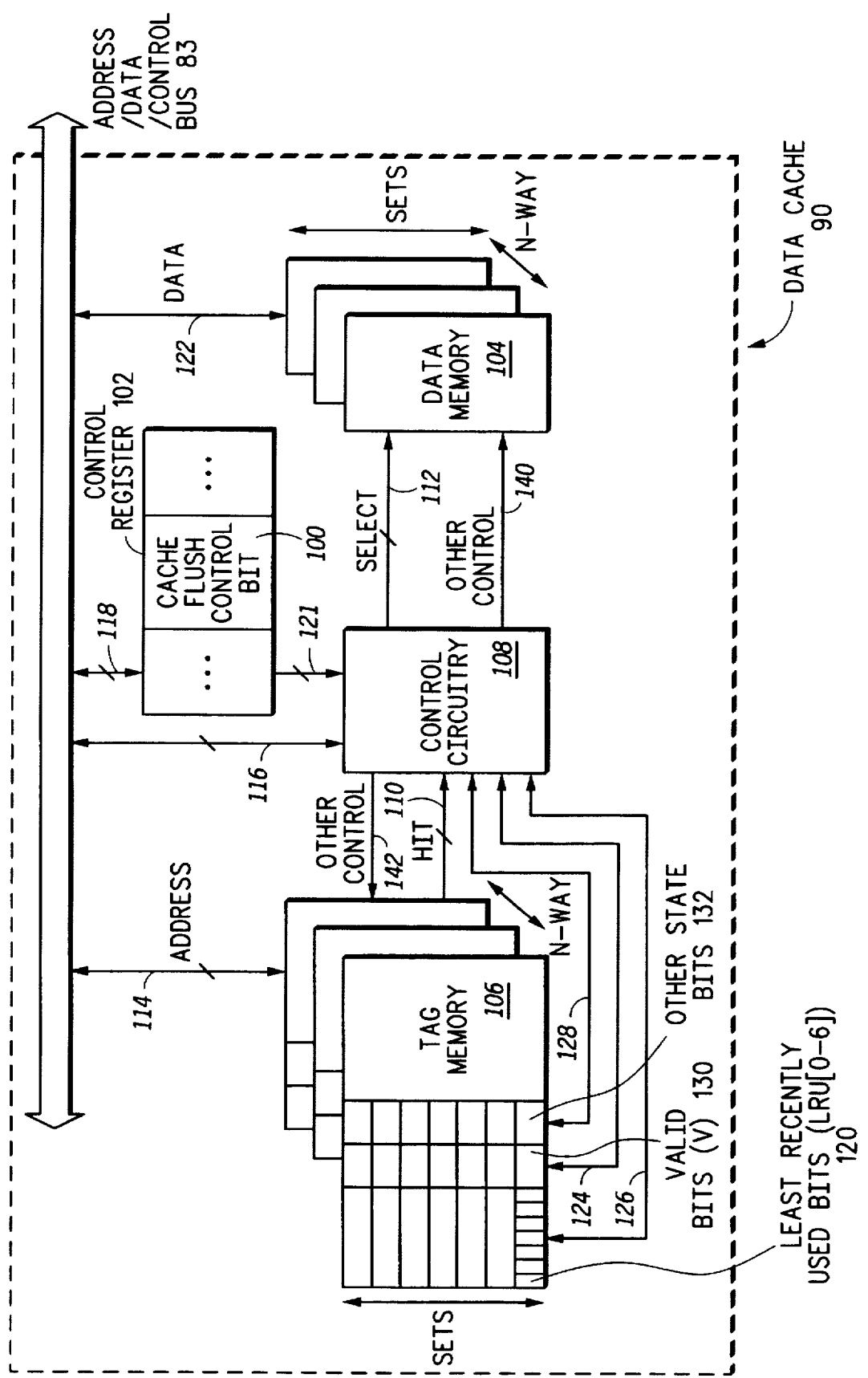
FIG. 4 illustrates, in block diagram form, data cache 90 of FIG. 3 in accordance with one embodiment of the present invention.

FIG. 4 illustrates one embodiment of data cache 90 of FIG. 3. Data cache 90 includes a data memory 104, a tag memory 106, control circuitry 108, and a control register 102. Data memory 104 is coupled to bus 83 by way of data conductors 122 and transfers data bi-directionally with bus 83. Tag memory 106 is coupled to bus 83 by way of bidirectional address conductors 114. Note that in one embodiment of the present invention, bus 83 includes address, data, and control information.

Control register 102 is coupled to bus 83 by way of conductors 118. Control circuitry 108 is coupled to bus 83 by way of conductors 116. Control circuitry 108 is coupled to control register 102 by way of conductors 121. Control circuitry 108 is coupled to data memory 104 by way of select conductors 112 and other control conductors 140. Control circuitry 108 is coupled to tag memory 106 by way of hit conductors 110 and other control conductors 142. In one embodiment of the present invention, select conductors 112 and other control conductors 140 are uni-directional.

Tag memory 106 has associated with it least recently used bits 120, valid bits 130, and other state bits 132. In one embodiment of the present invention there are seven least recently used bits 120 for each set. There is one valid bit for each line of each set. In some embodiments of the present invention, there are other state bits 132 for each line of each set. Note that tag memory 106 consists of a plurality of sets and a plurality of ways, as illustrated in FIG. 4 as N-ways. In addition, data memory 104 consists of a plurality of sets and a plurality of ways. Both sets and ways are well known in the art. Alternate embodiments of the present invention may organize data cache 90 differently than is illustrated in FIG. 4.

Note that control register 102 includes a cache flush control bit 100. The cache flush control bit 100 may be read and written by way of bus 83. In addition, the cache flush control bit 100 may be provided to control circuitry 108 by conductors 121. The least recently used bits 120 may be provided to control circuitry 108 by way of conductors 126. Valid bits 130 may be provided to control circuitry 108 by way of conductors 124. Other state bits 132 may be provided to control circuitry 108 by way of conductors 128.

OPERATION OF THE PREFERRED EMBODIMENT

The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Referring to the prior art, FIG. 1. FIG. 1 illustrates a prior art pseudo random replacement algorithm which is also used for flushing a cache set. The beginning of the algorithm starts at oval 10. Oval 10 proceeds to diamond 11. In diamond 11, the cache determines whether all the lines in the set are valid. If any of the lines in the set are not valid, the flow proceeds to diamond 12. Diamond 12 through diamond 18 of FIG. 1 illustrate a method of sequentially stepping through the valid bits corresponding to each line within that set. Note that there is one line for each way in the cache. At the diamond 12 the method checks the valid bit, V0, corresponding to line 0.

If the valid bit for line 0 is negated then line 0 may be allocated and used for the incoming data. If V0 is asserted, the flow continues to diamond 13. At diamond 13 the method checks the valid bit, V1, corresponding to line 1. If the valid bit for line 1 is negated then line 1 may be allocated and used for the incoming data. If V1 is asserted, the flow continues to diamond 14. At diamond 14 the method checks the valid bit, V2, corresponding to line 2. If the valid bit for line 2 is negated then line 2 may be allocated and used for the incoming data.

If V2 is asserted, the flow continues to diamond 15. At diamond 15 the method checks the valid bit, V3, corresponding to line 3. If the valid bit for line 3 is negated then line 3 may be allocated and used for the incoming data. If V3 is asserted, the flow continues to diamond 16. At diamond 16 the method checks the valid bit, V4, corresponding to line 4.

If the valid bit for line 4 is negated then line 4 may be allocated and used for the incoming data. If V4 is asserted, the flow continues to diamond 17. At diamond 15 the method checks the valid bit, V5, corresponding to line 5. If the valid bit for line 5 is negated then line 5 may be allocated and used for the incoming data. If V5 is asserted, the flow continues to diamond 18. At diamond 18 the method checks the valid bit, V6, corresponding to line 6. If the valid bit for line 6 is negated then line 6 may be allocated and used for the incoming data. If V6 is asserted, then line 7 may be allocated and used for the incoming data.

Note that the valid bit for line 7 need not be checked since in order to take this path through diamonds 12 through 18, there must have been at least one valid bit that was negated. Since valid bits V0 through V6 have been checked and have all been found to be asserted, valid bit V7 must be negated and no test of V7 need be made. Note that the "No" path from diamond 18 automatically allocates line 7 as available for replacement.

Returning to diamond 11, if all lines in the set are valid, the lest recently used (LRU) bits LRU0 to LRU6 are replaced. In one embodiment of the present invention, least recently used bits indicate an access ordering of the lines in a set. Note that the pseudo random replacement algorithm illustrated in FIG. 1 uses a reduced number of LRU bits compared to a full least recently used algorithm. The reduced LRU algorithm requires less semiconductor area and processes more quickly. Decision diamond 19 determines if bit LRU0 is asserted. Assertion of bit LRU0, indicates one of lines L0 through L3 is more recently accessed than all of lines L4 through L7, and therefore one of lines L4 through L7 is available to be replaced.

The flow then continues with decision diamond 21. Decision diamond 21 determines if bit LRU2 is asserted. If LRU2 is asserted, then one of lines L4 and L5 is more recent than all of lines L6 and L7 and therefore one of lines L6 and L7 is available to be replaced. The flow then continues with decision diamond 25. Decision diamond 25 determines if LRU6 is asserted. If LRU6 is asserted, that means that line L6 is more recent than line L7 and therefore line L7 is available to be replaced. Referring again to decision diamond 25, if the LRU6 is negated then line L7 is more recent than line L6 and line L6 is available to be replaced.

Referring to decision diamond 21, if LRU2 is negated, then one of lines L6 and L7 is more recent than all of lines L4 and L5 and the flow continues to decision diamond 24. At decision diamond 24, the method determines if LRU5 is asserted. If LRU5 is asserted, then line L4 is more recent than line L5 and line L5 may be replaced. If the LRU5 bit is negated, then line L5 is more recent than line L4 and line L4 is available to be replaced. Returning to decision diamond 19, if LRU0 bit is negated, then one of lines L4 through L7 is more recent than all of lines L0 through L3 and the flow continues at decision diamond 20.

At decision diamond 20, the method determines if LRU1 is asserted. If the LRU1 bit is asserted, then one of lines L0 to L1 is more recent than all of lines L2 and L3 and the flow continues at decision diamond 23. At decision diamond 23, the method determines if the LRU 4 bit is asserted. If the LRU4 bit is asserted, then line L2 is more recent than line L3 and line L3 may be allocated. However, if LRU4 bit is negated, then line L3 is more recent than line L2 and line L2 may be reallocated. Returning to decision diamond 20, if the LRU1 bit is negated, then one of lines L2 and L3 is more recent than all of lines L0 and L1 and the flow continues at decision diamond 22. At decision diamond 22, the method determines if the LRU 3 bit is asserted. If the LRU3 bit is asserted, then line L0 is more recent than line L1 and line L1 may be reallocated. If the LRU3 bit is negated, then line L1 is more recent than line L0, than line L0 may be reallocated.

Note that the prior art algorithm illustrated in FIG. 1 checks all of the valid bits for each line before checking any of the least recently used bits for any line. The purpose of checking the valid bits first is that a negated valid bit clearly indicates that that line is presently not being used in the cache and may be allocated to store incoming data, whereas the least recently used bits indicate lines that may be valid but have not been used recently by the cache.

Therefore for a non-flushing replacement algorithm, it is more efficient to check the valid bits first and then check the less recently used bits in order to determine which line should be replaced. Each iteration through the flow illustrated in FIG. 1 determines one line that may be replaced. If a plurality of lines must be replaced, then a plurality of iterations through the flow illustrated in FIG. 1 is required. For cache flush operations, it is desirable to select all ways with as few iterations through the flow as possible. Thus the present invention required a modification to the replacement algorithm that would allow for replacement of all ways requiring as few iterations through the replacement flow as possible. In fact, the optimum solution would be an algorithm that replaces all ways using one iteration for each way.

As an example, for an 8 way cache, the optimum flushing algorithm would require 8 iterations through the replacement algorithm in order to flush that entire set of lines. Unfortunately, the prior art replacement algorithm illustrated in FIG. 1 may require up to 12 iterations through the algorithm in order to replace all 8 ways of the cache when flushing the cache. Thus a new replacement algorithm was needed that would allow for more efficient flushing of the cache.

Referring now to FIG. 2, a cache flush control bit is used to determine whether or not the replacement operation being performed by the cache requires a cache flush or not. If the cache flush control bit is asserted, then the flow skips the entire branch including decision diamonds 41 through 48 in order to move directly to the least recently used bits. Note that the valid bits are not used in this case. Referring to decision diamond 40, if the cache flush control bit is negated, however, the flow continues to decision diamond 41. From decision diamond 41 to the end of the algorithm, the flow may be the same as the prior art illustrated in FIG. 1. Thus the cache flush control bit decision diamond 40 may be used to by pass the usage of the valid bits as illustrated in decision diamonds 42 through 48.

Referring now to FIG. 3, FIG. 3 illustrates one embodiment of a data processor 70. Alternate embodiments of the present invention may use any type of architecture or structure for processor 70. The particular architecture illustrated in FIG. 3, operates in the prior art manner with the exception of data cache 90.

Referring to FIG. 4, FIG. 4 illustrates one embodiment of data cache 90. Data cache 90 includes a cache flush control bit 100 which is located in control register 102. Alternate embodiments of the present invention include the functionality of cache flush control bit 100 in one or more bits. For example, the functionality of cache flush control bit 100, may be encoded in an entire bit field within control register 102. In alternate embodiments of the present invention, the functionality of cache flush control bit 100 may not be implemented directly in data cache 90, but may be provided from external to processor 70 by way of one or more integrated circuit terminals.

In addition, the functionality of cache flush control bit 100 may be implemented in a different portion of processor 70 and thus may not be included as part of data cache 90, but as another part processor 70. In an alternate embodiment of the present invention, an instruction may include the cache flush control bit 100 as part of the instruction itself. Note that the cache flush control bit 100 illustrated in FIG. 4 may be read and written by way of bus 83. The cache flush control bit 100 is provided to control circuitry 108 by way of conductors 121.

Control circuitry 108 may be used to perform the flow illustrated in FIG. 2. By receiving the cache flush control bit 100, the least recently used bits 120 and the valid bits 130 control circuitry 108 may implement the entire flow illustrated in FIG. 2. Control circuitry 108 uses select conductors 112 to reallocate the lines selected by the algorithm illustrated in FIG. 2. Note that with the exception of cache flush control bit 100 illustrated in FIG. 2., data cache 90 operates in the same manner as a prior art data cache.

Note that the replacement algorithm illustrated in FIG. 2 may be used for other types of caches other than data caches. Data cache 90 has merely been used as one possible example of a cache that implements the algorithm illustrated in FIG. 2. Although the embodiment of data cache 90 illustrated in FIG. 4 uses seven least recently used bits 120, alternate embodiments of the present invention may use any number of least recently used bits 120.

Although most caches use one valid bit per way per set, it is possible that some cache implementations may require more than one valid bit. Alternate embodiments of the present invention may have one or more other state bits 132 that are used for various purposes. For example, an other state bit 132 may be used to indicate that processor 70 has modified that particular line of cache. Note that data cache 90 may use any type of architecture that includes control circuitry 108 which receives a cache flush control input which allows control circuitry 108 to implement decision diamond 40 illustrated in FIG. 2.

The present invention offers a method of flushing a cache without redundant iterations. The present invention allows the user to bypass the decision to search for an invalid line, reducing the resultant excessive iterations introduced in a typical pseudo least recently used algorithm. The bypass in effect ignores the valid bits associated with each line. Without the bypass, data cache 90 replacement operation is consistent with typical pseudo least recently used algorithms. Although the present invention has been illustrated in the context of a data cache, the present invention may be used for cache types other than data memory. The present invention may be implemented in an integrated circuit, an integrated circuit board, or a combination of both.

It is to be understood, therefore, that this invention is not limited to the particular forms illustrated and that it is intended in the appended claims to cover all modifications that do not depart from the spirit and scope of this invention.

We claim:

1. A method for performing a replacement operation in a data processing system, the method comprising the steps of:

if said replacement operation is to flush a cache, asserting a cache flush control bit;

receiving at least one instruction to perform said replacement operation;

determining if said cache flush control bit is asserted;

if said cache flush control bit is not asserted, determining if all portions of a cache set are valid;

if all portions of said cache set are not valid, determining a replacement portion of said cache based on a valid bit associated with each portion of said cache set;

if all portions of said cache set are valid, determining said replacement portion of said cache based on access ordering information;

if said cache flush control bit is asserted, determining a replacement portion of said cache based on said access ordering information; and performing said replacement operation to said replacement portion of said cache.

2. A method as in claim 1, wherein said step of determining said replacement portion of said cache based on access ordering information uses a pseudo-least recently used (LRU) algorithm.

3. A method as in claim 1, wherein said step of determining if all portions of the cache set are valid comprises determining if all lines of the cache set are valid.

4. An integrated circuit, said integrated circuit comprising:

a data processor; and a cache, said cache comprising:

a first memory circuit, said first memory circuit having a first set, wherein said first set comprises a first cache line and a second cache line;

a second memory circuit, said second memory circuit having a first access indicator associated with said first set, said second memory circuit having a first address tag and a first valid indicator associated with said first cache line, said second memory circuit having a second address tag and a second valid indicator associated with said second cache line;

a control circuitry coupled to said first memory circuit and said second memory circuit; and a control register associated with said control circuitry, said control register storing a cache flush control bit;

wherein said first access indicator indicates a first access ordering associated with said first set; and wherein in response to said data processor performing a replacement operation, if said cache flush control bit is asserted, said control circuitry determines a replacement line based on said first access indicator.

5. An integrated circuit as in claim 4, wherein said first access indicator is at least one least recently used (LRU) bit.

6. An integrated circuit as in claim 4, wherein in response to said data processor performing a replacement operation, if said cache flush control bit is not asserted, said control circuitry determines if said first cache line and said second cache line are valid;

wherein in response to said control circuitry determining that at least one of said first and second cache lines is (are) not valid, said control circuitry allocates an invalid line as said replacement line; and wherein in response to said control circuitry determining that said first and said second cache lines is (are) valid, said control circuitry determines said replacement line based on said first access indicator.

7. An integrated circuit as in claim 4, wherein said first memory circuit further comprises:

a second set, wherein said second set comprises a third cache line and a fourth cache line; and wherein said second memory circuit further comprises:

a second access indicator associated with said second set;

a third address tag and a third valid indicator associated with said third cache line; and a fourth address tag and a fourth valid indicator associated with said fourth cache line.

8. An integrated circuit as in claim 7, wherein said second access indicator indicates a second access ordering associated with said second set; and wherein in response to said data processor performing said replacement operation, if said cache flush control bit is asserted, said control circuitry determines a second replacement line based on said second access indicator.

9. A cache, comprising:

a data memory circuit having a plurality of cache lines;

a tag memory circuit for storing tag address information, said tag memory circuit having at least one least recently used (LRU) bit and at least one valid bit;

a control circuit coupled to said data memory circuit and said tag memory circuit; and a control register associated with said control circuit, said control register having a cache flush control bit;

wherein assertion of said cache flush control bit indicates a flush of at least one of said plurality of cache lines; and wherein if said cache flush control bit is asserted, a replacement line is determined based on said at least one least recently used (LRU) bit.

10. A cache as in claim 9, wherein said cache is implemented in an integrated circuit.

11. A cache as in claim 10, wherein said data memory circuit comprises a plurality of sets, each having eight cache lines; and wherein each set has seven least recently used (LRU) bits to indicate access ordering of associated cache lines.

12. A cache as in claim 11, wherein each cache line has an associated valid bit.

* * * * *